(12) United States Patent
Shan et al.

(10) Patent No.: US 8,619,683 B2
(45) Date of Patent: Dec. 31, 2013

(54) APPARATUS AND METHOD FOR ALLOCATING BURSTS IN A BROADBAND WIRELESS COMMUNICATION SYSTEM

(75) Inventors: Cheng Shan, Suwon-si (KR); Do-Young Kim, Yongin-si (KR); Eun-Taek Lim, Suwon-si (KR); Jung-Soo Woo, Suwon-si (KR); Geun-Ho Lee, Suwon-si (KR); Sang-Bum Kim, Seoul (KR); Yong-Ho Park, Cheonan-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1108 days.

(21) Appl. No.: 12/378,521

(22) Filed: Feb. 17, 2009

(65) Prior Publication Data

US 2009/0207798 A1 Aug. 20, 2009

(30) Foreign Application Priority Data

Feb. 18, 2008 (KR) .................. 10-2008-0014359

(51) Int. Cl.
*H04W 4/00* (2009.01)
*H04B 7/204* (2006.01)
*H04J 3/16* (2006.01)

(52) U.S. Cl.
USPC ............................ 370/329; 370/319; 370/468

(58) Field of Classification Search
USPC ................... 370/319, 329, 330, 343, 344, 482
See application file for complete search history.

(56) References Cited

U.S. PATENT DOCUMENTS

| 6,018,528 | A | * | 1/2000 | Gitlin et al. | 370/436 |
|---|---|---|---|---|---|
| 2005/0286408 | A1 | * | 12/2005 | Jin et al. | 370/208 |
| 2006/0262768 | A1 | * | 11/2006 | Putzolu | 370/344 |
| 2007/0110104 | A1 | * | 5/2007 | Sartori et al. | 370/436 |
| 2008/0031190 | A1 | * | 2/2008 | Bae et al. | 370/329 |
| 2009/0103561 | A1 | * | 4/2009 | Qi et al. | 370/468 |
| 2011/0058525 | A1 | * | 3/2011 | Perez Costa et al. | 370/329 |
| 2011/0090879 | A1 | * | 4/2011 | Hamiti et al. | 370/338 |

* cited by examiner

*Primary Examiner* — Warner Wong (57) ABSTRACT

A wireless communication system using multiple channels is provided. An apparatus includes an allocator for, when bursts are allocated to an Accessing Terminal (AT) which utilizes a plurality of channels at the same time, allocating the same amount of the bursts to each channel in use; a generator for, when a map message to be transmitted in a primary channel of the AT is generated, generating the map message which comprises allocation information of the bursts allocated to the AT; and a transmitter for transmitting the map message in the primary channel of the AT.

24 Claims, 8 Drawing Sheets

APPARATUS AND METHOD FOR ALLOCATING BURSTS IN A BROADBAND WIRELESS COMMUNICATION SYSTEM

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on Feb. 18, 2008 and assigned Serial No. 10-2008-0014359, the entire disclosure of which is hereby incorporated by reference.

TECHNICAL FIELD OF THE INVENTION

The present invention relates generally to a broadband wireless communication system. More particularly, the present invention relates to an apparatus and a method for allocating bursts in the broadband wireless communication system.

BACKGROUND OF THE INVENTION

A fourth generation (4G) communication system, which is a next-generation communication system, aims to provide users with services of various Quality of Service (QoS) levels at a data rate of about 100 Mbps. Particularly, present-day 4G communication systems are advancing in order to guarantee mobility and QoS and to support high-speed services in Broadband Wireless Access (BWA) communication systems such as wireless local area network systems and wireless metropolitan area network systems. Representative examples include the Institute of Electrical and Electronics Engineers (IEEE) 802.16 communication systems. The IEEE 802.16 communication systems adopt Orthogonal Frequency Division Multiplexing (OFDM)/Orthogonal Frequency Division Multiple Access (OFDMA) schemes to support a broadband transmission network in physical channels.

In the broadband wireless communication system based on the OFDM/OFDMA, such as the IEEE 802.16 system, a base station performs multi-access communication with a plurality of Accessing Terminals (ATs) by transmitting and receiving OFDM symbols. The transmission interval from the base station to the AT is referred to as a Down Stream (DS) frame, and the transmission interval from the AT to the base station is referred to as an Up Stream (US) frame. Herein, the DS frame and the US frame are time intervals including a certain number of OFDM symbols. The OFDM symbol includes a plurality of carriers in a frequency domain. A bundle of the carriers is referred to as a subchannel. The base station allocates the subchannels to the plurality of ATs, and the ATs each receive and transmit signals over at least one allocated subchannel. A bundle of subchannels allocated to one AT is referred to as a burst.

To transmit and receive signals through the allocated burst, the AT needs to acquire physical location information of the allocated burst. The physical location information of the burst is contained in a DS map message and a US map message. Before transmitting the signal in the burst, the base station broadcasts the DS map message and the US map message to its connected ATs. The DS map message and the US map message are the requisite information for the sake of the communication between the base station and the AT, but act as overhead by competitively occupying data and resources. In other words, the data rate of the system can be raised by reducing the resources occupied by the DS map message and the US map message. Thus, what is needed is a method for reducing the overhead caused by the map messages.

SUMMARY OF THE INVENTION

To address the above-discussed deficiencies of the prior art, it is a primary aspect of the present invention to address at least the above mentioned problems and/or disadvantages and to provide at least the advantages described below. Accordingly, an aspect of the present invention is to provide an apparatus and a method for reducing overhead caused by map messages in a broadband wireless communication system.

Another aspect of the present invention is to provide an apparatus and a method for instructing allocation information of a burst allocated to an Accessing Terminal (AT) using a plurality of channels as allocation information relating to one channel in a broadband wireless communication system.

Yet another aspect of the present invention is to provide an apparatus and a method for allocating a burst of the same amount per channel to an AT using a plurality of channels in a broadband wireless communication system.

Still another aspect of the present invention is to provide an apparatus and a method for allocating a burst of the same position in each channel to an AT using a plurality of channels in a broadband wireless communication system.

According to one aspect of the present invention, an apparatus for a base station in a broadband wireless communication system using multiple channels includes an allocator for, when bursts are allocated to an AT which utilizes a plurality of channels at the same time, allocating the same amount of the bursts to each channel in use; a generator for, when a map message to be transmitted in a primary channel of the AT is generated, generating the map message which comprises allocation information of the bursts allocated to the AT; and a transmitter for transmitting the map message in the primary channel of the AT.

According to another aspect of the present invention, an apparatus for an AT in a broadband wireless communication system using multiple channels includes an analyzer for analyzing a map message received in a primary channel among a plurality of channels in use; and a controller for locating bursts assigned to the AT in channels in use according to burst allocation information acquired from the map message.

According to yet another aspect of the present invention, an operating method of a base station in a broadband wireless communication system using multiple channels includes when allocating bursts to an AT which utilizes a plurality of channels at the same time, allocating the same amount of the bursts to each channel in use; when generating a map message to be transmitted in a primary channel of the AT, generating the map message which comprises allocation information of the bursts allocated to the AT; and transmitting the map message in the primary channel of the AT.

According to still another aspect of the present invention, an operating method of an AT in a broadband wireless communication system using multiple channels includes analyzing a map message received in a primary channel among a plurality of channels in use; and locating bursts assigned to the AT in channels in use according to burst allocation information acquired from the map message.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Exemplary embodiments of the present invention provide a burst allocation technique in a broadband wireless communication system. Although an Orthogonal Frequency Division Multiplexing (OFDM)/Orthogonal Frequency Division Multiple Access (OFDMA) wireless communication system is illustrated by way of example, the present invention is applicable to other wireless communication systems.

A channel structure used in the broadband wireless communication system is described now.

According to an exemplary embodiment of the present invention, a base station selects available channels using a Cognitive Radio (CR) scheme. More specifically, the base station checks whether a frequency band occupied by another wireless communication system is used or not, and utilizes the unused band as an unlicensed state. For example, the frequency band of a television (TV) broadcasting system can be used by the unlicensed broadband wireless communication system of the present invention. In this case, the bandwidth of each channel is the bandwidth of one TV channel.

Each individual channel has an independent frame structure. A preamble signal for acquiring the frame synchronization and a map message for informing the resource allocation information are transmitted per channel. On the contrary, OFDM symbols transmitted per channel are not generated through a separate Inverse Fast Fourier Transform (IFFT) operation, but are generated through a single IFFT operation in the size including all the channels. For example, when the number of carriers in each channel is $N_{FFT}$ and the base station can use four channels at the same time, the base station conducts the IFFT operation in the size of $4 \times N_{FFT}$. Correspondingly, the base station is able to utilize four or less neighbor channels. The base station can also use three or less channels, not adjacent to each other, in four neighbor channel bands.

Depending on the number of the channels used and the channel band, the frequency spectrum range of the signals transmitted and received between the base station and Accessing Terminals (ATs) is variable. Hereafter, the signal processing scheme of the varying frequency spectrum is referred to as a Scalable-OFDMA (S-OFDMA) scheme.

Specifically, the present invention provides the technique for allocating resources in the S-OFDMA broadband wireless communication system, and generating and analyzing a map message indicative of the resource allocation information. The map message is a Media Access Control (MAC) management message which informs ATs of resource allocation information. Note that the present invention is applicable to systems not adopting the CR scheme.

In this embodiment of the present invention, the base station allocates the resources by dividing the ATs into two types, i.e., Extended Band (EB) ATs and Narrow Band (NB) ATs. The EB AT can utilize a plurality of channels at the same time, and the NB AT can utilize only one channel at a time. With the ATs classified as above, the base station determines the available channels and then allocates the resources preferentially to the EB ATs. In allocating the resources to an EB AT, the base station equally distributes the resources in all the channels being used by the EB AT. For example, when the base station using four channels allocates 12 subchannels to the EB AT capable of using four channels at the same time, the base station assigns three subchannels per channel to the EB AT. The resource allocated to the EB AT in each channel is arranged to be identified with the same location information in each channel.

Now, the resource allocation scheme of the present invention is explained in detail.

First, the burst is rectangular, i.e., the burst is allocated in two dimensions.

Figure 1:
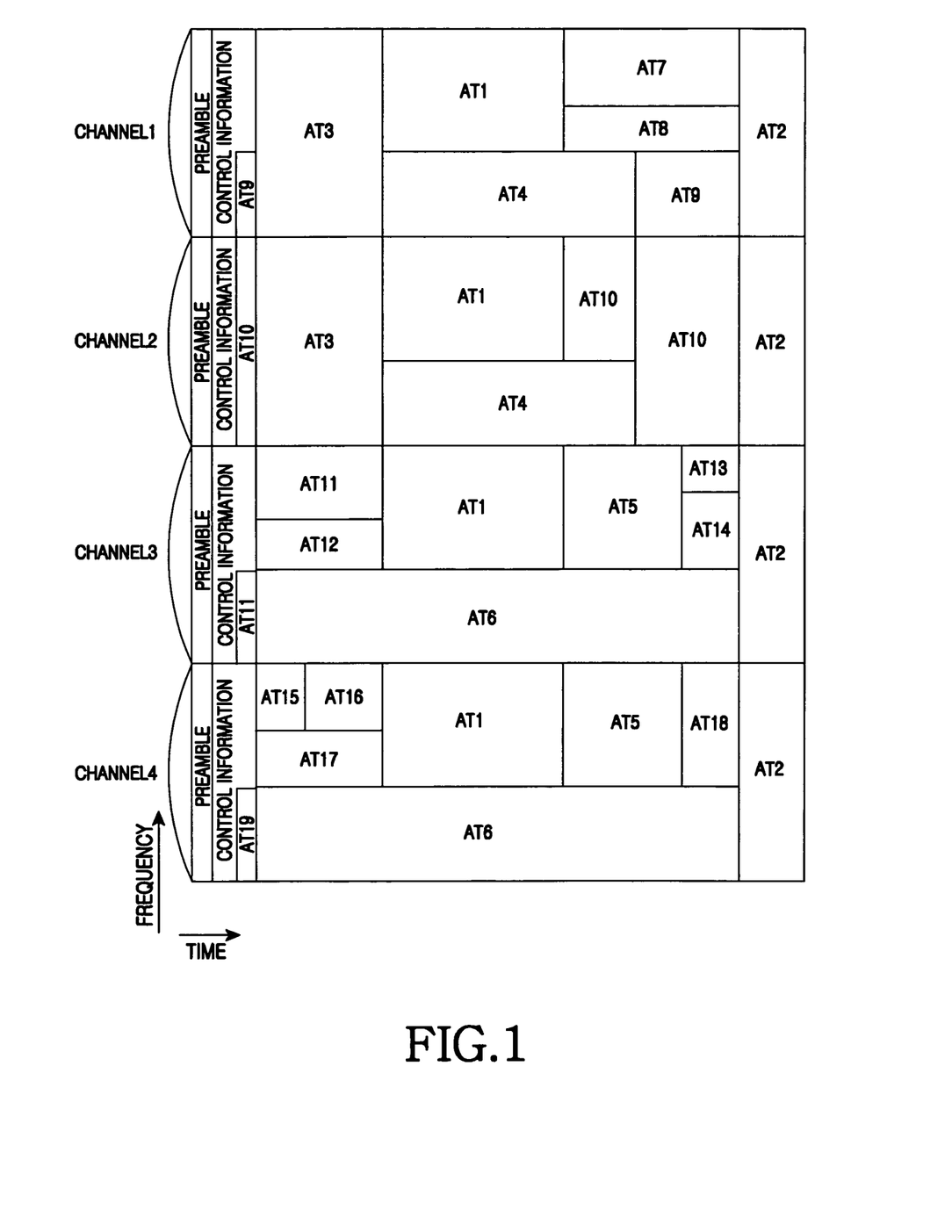
FIG. 1 illustrates a distribution of two-dimensional bursts allocated when consecutive channels are used in a broadband wireless communication system according to an exemplary embodiment of the present invention.

An AT 1 and an AT 2 are EB ATs using four channels at the same time, an AT 3 through an AT 6 are EB ATs using two channels at the same time, and an AT 7 through an AT 19 are NB ATs using only one channel. The base station utilizes four channels including a channel 1 through a channel 4.

Each AT is assumed to know its primary channel which carries its map message. For example, when the primary channel of the AT 1 and the AT 2 is the channel 1, the AT 1 and the AT 2 use only map messages received in the channel 1 and ignore map messages received in the channel 2, the channel 3, and channel 4. When the primary channel of the AT 5 and the AT 6 is the channel 3, the AT 5 and the AT 6 use only map messages received in the channel 3 and ignore map messages received in the channel 1, the channel 2, and the channel 4.

Since the AT 1 and the AT 2 are using the greatest number of the channels, the base station allocates the bursts preferentially to the AT 1 and the AT 2. The burst allocation information of the AT 1 and the AT 2 is transmitted through the channel 1. Herein, the burst allocation information includes burst start information and burst end information in one channel. By analyzing the map message received in the channel 1, the AT 1 and the AT 2 confirm the start information and the end information of their allocated burst and recognize the region in each channel indicated by the start information and the end information as their allocated burst. Next, the base station allocates the burst to the AT 3 and the AT 4 within the channel 1 and the channel 2 and transmits the burst allocation information of the AT 3 and the AT 4 through the channel 1. The base station allocates the burst to the AT 5 and the AT 6 within the channel 3 and the channel 4 and transmits the burst allocation information of the AT 5 and the AT 6 through the channel 3. Finally, the base station allocates the bursts to the AT 7 through the AT 19 and transmits the burst allocation information through the channels of the bursts.

When the burst allocation is carried out as above, the distribution of the allocated bursts is shown in FIG. 1. As shown in FIG. 1, the bursts allocated to the AT 1 and the AT 2 are distributed over the channel 1 through the channel 4, and the start point and the end point of each burst are the same. The bursts allocated to the AT 3 and the AT 4 are distributed over the channel 1 and the channel 2, and the start point and the end point of each burst are the same. The bursts allocated to the AT 5 and the AT 6 are distributed over the channel 3 and the channel 4, and the start point and the end point of each burst are the same. The bursts allocated to the AT 7 and the AT 19 are positioned in one channel.

When the bursts are allocated as shown in FIG. 1, the Down Stream (DS) map message is constituted as shown in Table 1.

TABLE 1

| Channels | Context |
| --- | --- |
| channel 1 | CID: AT1; burst start, burst end |
| | CID: AT2; burst start, burst end |
| | CID: AT3; burst start, burst end |
| | CID: AT4; burst start, burst end |
| | CID: AT7; burst start, burst end |
| | CID: AT8; burst start, burst end |
| | CID: AT9; burst start, burst end |
| | CID: AT9; burst start, burst end |
| channel 2 | CID: AT10; burst start, burst end |
| | CID: AT10; burst start, burst end |
| | CID: AT10; burst start, burst end |
| channel 3 | CID: AT5; burst start, burst end |

TABLE 1-continued

| Channels | Context |
| --- | --- |
| | CID: AT6; burst start, burst end |
| | CID: AT11; burst start, burst end |
| | CID: AT11; burst start, burst end |
| | CID: AT12; burst start, burst end |
| | CID: AT13; burst start, burst end |
| | CID: AT14; burst start, burst end |
| channel 4 | CID: AT15; burst start, burst end |
| | CID: AT16; burst start, burst end |
| | CID: AT17; burst start, burst end |
| | CID: AT18; burst start, burst end |
| | CID: AT19; burst start, burst end |

To support the ATs which use two or three channels at the same time, the base station has to prepare channel sets instructing the channel distribution. Each set includes elements indicative of at least one channel. The number of channels indicated by the elements is 4. That is, the channels indicated by the elements in one set do not overlap. Hence, the base station selects the optimum set per frame based on the capability of the ATs to be assigned the bursts. To support all the possibilities, the base station allocates the bursts by changing the set of the channels per frame. For example, the set {[channel1, channel2], [channel3, channel 4]} is applied in FIG. 1.

Figure 2:
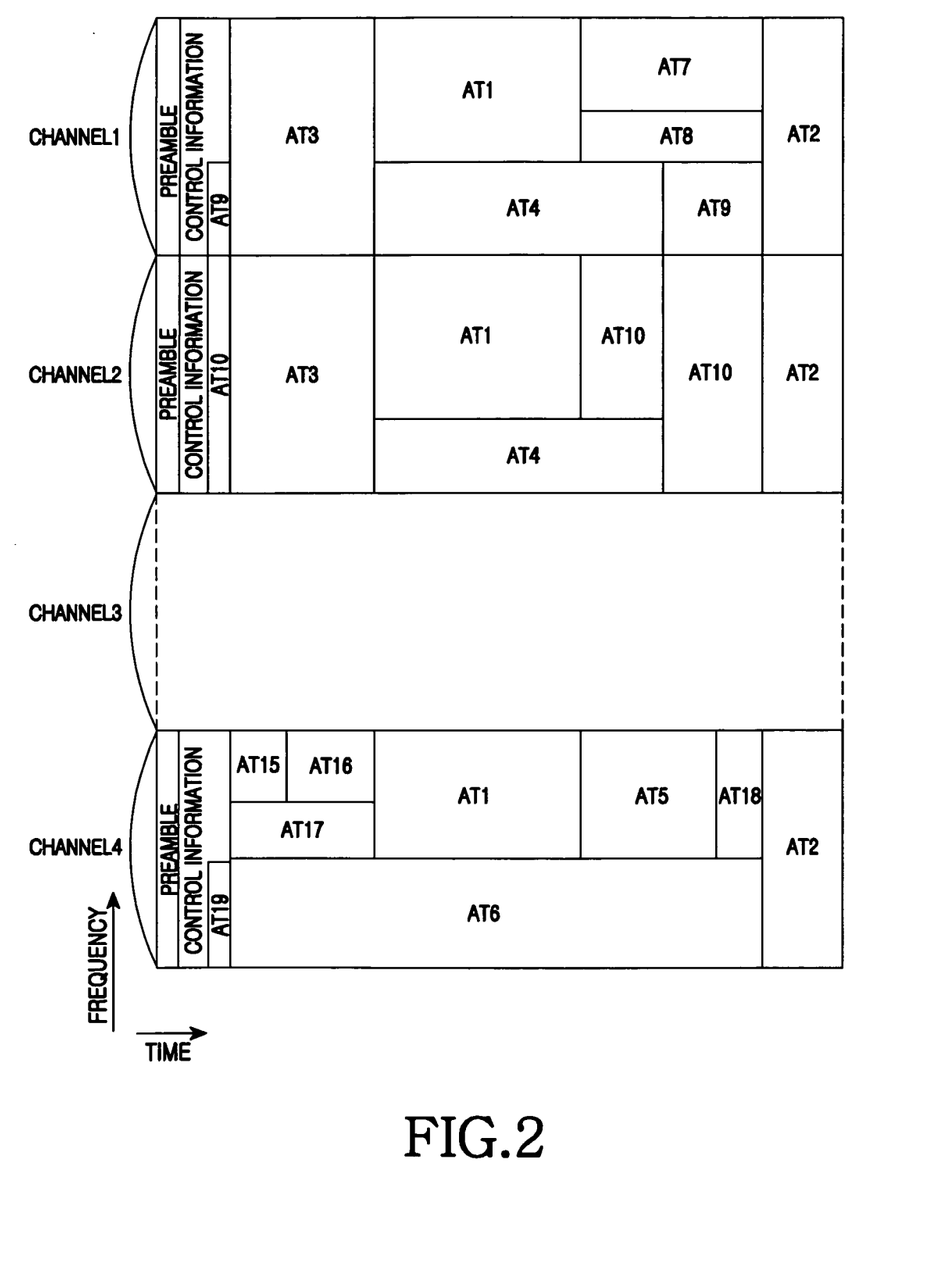
FIG. 2 illustrates a distribution of two-dimensional bursts allocated when nonconsecutive channels are used in the broadband wireless communication system according to an exemplary embodiment of the present invention.

Even when the base station uses three nonconsecutive channels, the above-mentioned method is applied in the similar manner. Using three nonconsecutive channels, the allocated bursts are distributed as shown in FIG. 2. FIG. 2 depicts the distribution of the assigned bursts when the base station uses the channel 1, the channel 2, and the channel 4. The burst distribution of FIG. 2 excludes merely the channel 3 from the burst distribution of FIG. 1. Given the burst distribution of FIG. 2, the burst allocation and the map message constitution are substantially the same as in FIG. 1. Only the burst allocation process and the map message for the channel 3 shall be omitted here.

Next, the burst is linear, i.e., the burst is allocated in one dimension.

Figure 3:
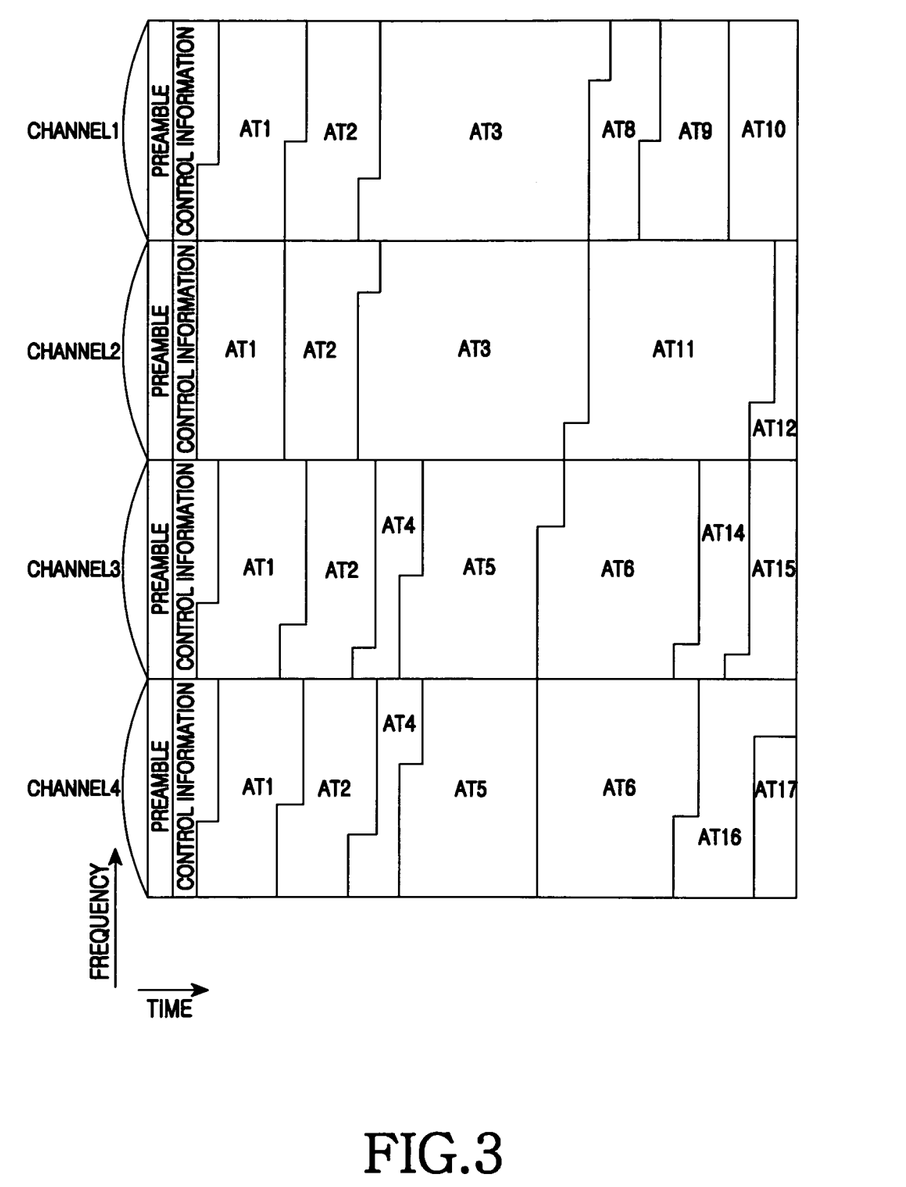
FIG. 3 illustrates a distribution of one-dimensional bursts allocated when consecutive channels are used in a broadband wireless communication system according to an exemplary embodiment of the present invention.

An AT 1 and an AT 2 are EB ATs using four channels at the same time, an AT 3 through an AT 6 are EB ATs using two channels at the same time, and an AT 7 through an AT 17 are NB ATs using only one channel. The base station utilizes four channels including a channel 1 through a channel 4.

Each AT is assumed to know its primary channel which carries its map message. For example, when the primary channel of the AT 1 and the AT 2 is the channel 1, the AT 1 and the AT 2 use only map messages received in the channel 1 and ignore map messages received in the channel 2, the channel 3, and channel 4. When the primary channel of the AT 5 and the AT 6 is the channel 3, the AT 5 and the AT 6 use only map messages received in the channel 3 and ignore map messages received in the channel 1, the channel 2, and the channel 4.

Since the AT 1 and the AT 2 are using the greatest number of the channels, the base station allocates the bursts preferentially to the AT 1 and the AT 2. The burst allocation information of the AT 1 and the AT 2 is transmitted through the channel 1. Herein, the burst allocation information includes burst length information in one channel. By analyzing the map message received in the channel 1, the AT 1 and the AT 2 acquire the length information of their allocated burst and length information of previous bursts, and recognize the region in each channel as indicated by the length information as their allocated burst. Next, the base station allocates the burst to the AT 3 within the channel 1 and the channel 2 and transmits the burst allocation information of the AT 3 through the channel 1. The base station allocates the bursts to the AT 4, 5 and 6 within the channel 3 and the channel 4 and transmits the burst allocation information of the ATs 4, 5 and 6 through the channel 3. Finally, the base station allocates the bursts to the AT 7 through the AT 17 and transmits the burst allocation information through the channels of the bursts.

Herein, the map message includes dummy burst allocation information if necessary. While the absolute location of the rectangular burst is acquired from the start information and the end information, the location of the linear burst is acquired based relative to the length of the previous burst. The ATs 4, 5 and 6, receiving the map message of the channel 3 without the burst allocation information of the AT 1 and the AT 2, can determine the location of their burst only by acquiring the length information of the bursts assigned to the AT 1 and the AT 2. Hence, the map message transmitted in the channel 3 carries total length information of the bursts allocated to the AT 1 and the AT 2 as the dummy burst allocation information. That is, the map message carries the total length information of the bursts which are allocated in its channel but does not include the allocation information as the dummy burst allocation information. Since the bursts are linearly allotted, the same amount of the bursts in each channel is allocated to one AT, whereas its physical location and form may vary.

In the burst allocation as above, the assigned bursts are distributed as shown in FIG. 3. As shown in FIG. 3, the bursts allocated to the AT 1 and the AT 2 are distributed over the channel 1 through the channel 4, and the length of each burst is the same. The bursts allocated to the AT 3 are distributed over the channel 1 and the channel 2, and the length of each burst is the same. The bursts allocated to the ATs 4, 5 and 6 are distributed over the channel 3 and the channel 4, and the length of each burst is the same. The bursts allocated to the AT 7 and the AT 17 are positioned in one channel.

When the bursts are allocated as shown in FIG. 3, the DS map message is constituted as shown in Table 2.

TABLE 2

| Channels | Context |
| --- | --- |
| channel 1 | CID: AT1; burst length |
|  | CID: AT2; burst length |
|  | CID: AT3; burst length |
|  | CID: AT8; burst length |
|  | CID: AT9; burst length |
|  | CID: AT10; burst length |
| channel 2 | CID: dummy AT; burst length (AT1 + AT2 + AT3) |
|  | CID: AT11; burst length |
|  | CID: AT12; burst length |
| channel 3 | CID: dummy AT; burst length (AT1 + AT2) |
|  | CID: AT4; burst length |
|  | CID: AT5; burst length |
|  | CID: AT6; burst length |
|  | CID: AT14; burst length |
|  | CID: AT15; burst length |
| channel 4 | CID: dummy AT; burst length (AT1 + AT2 + AT4 + AT5 + AT6) |
|  | CID: AT16; burst length |
|  | CID: AT17; burst length |

To support the ATs which use two or three channels at the same time, the base station has to prepare sets for distinguishing four channels. Each set includes elements including at least one channel. The number of channels in each element of one set is 4. That is, the channels in the elements in one set do not overlap. Hence, the base station selects the optimum set per frame based on the capability of the ATs to be assigned the bursts. To support all the possibilities, the base station allocates the bursts by changing the set for distinguishing the channels per frame. For example, the set {[channel1, channel2], [channel3, channel 4]} is applied in FIG. 1.

Figure 4:
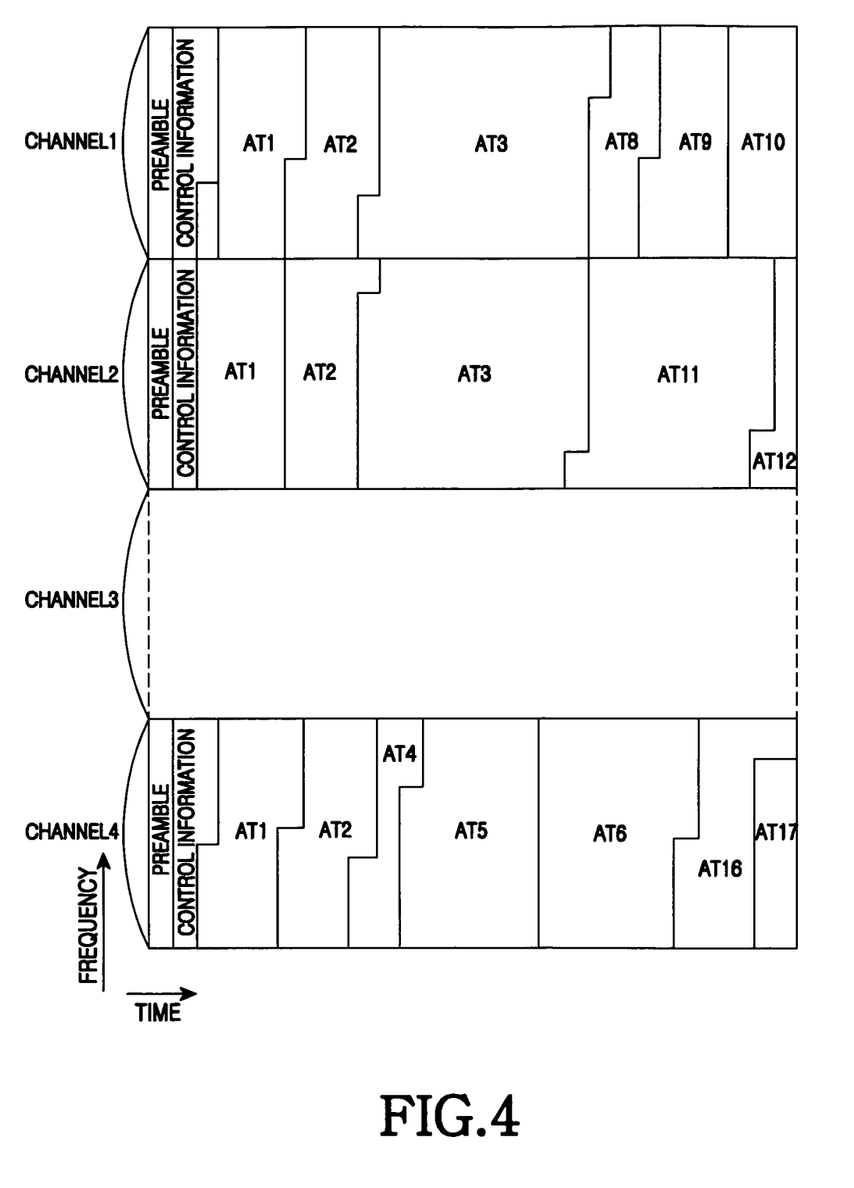
FIG. 4 illustrates a distribution of one-dimensional bursts allocated when nonconsecutive channels are used in the broadband wireless communication system according to an exemplary embodiment of the present invention.

Even when the base station uses three nonconsecutive channels, the above-mentioned method is applied in a similar manner. Using three nonconsecutive channels, the allocated bursts are distributed as shown in FIG. 4. FIG. 4 depicts the distribution of the assigned bursts when the base station uses the channel 1, the channel 2, and the channel 4. The burst distribution of FIG. 4 merely excludes the channel 3 from the burst distribution of FIG. 3. Given the burst distribution of FIG. 4, the burst allocation and the map message constitution are substantially the same as in FIG. 3. Only the burst allocation process and the map message for the channel 3 shall be omitted here.

Figure 5:
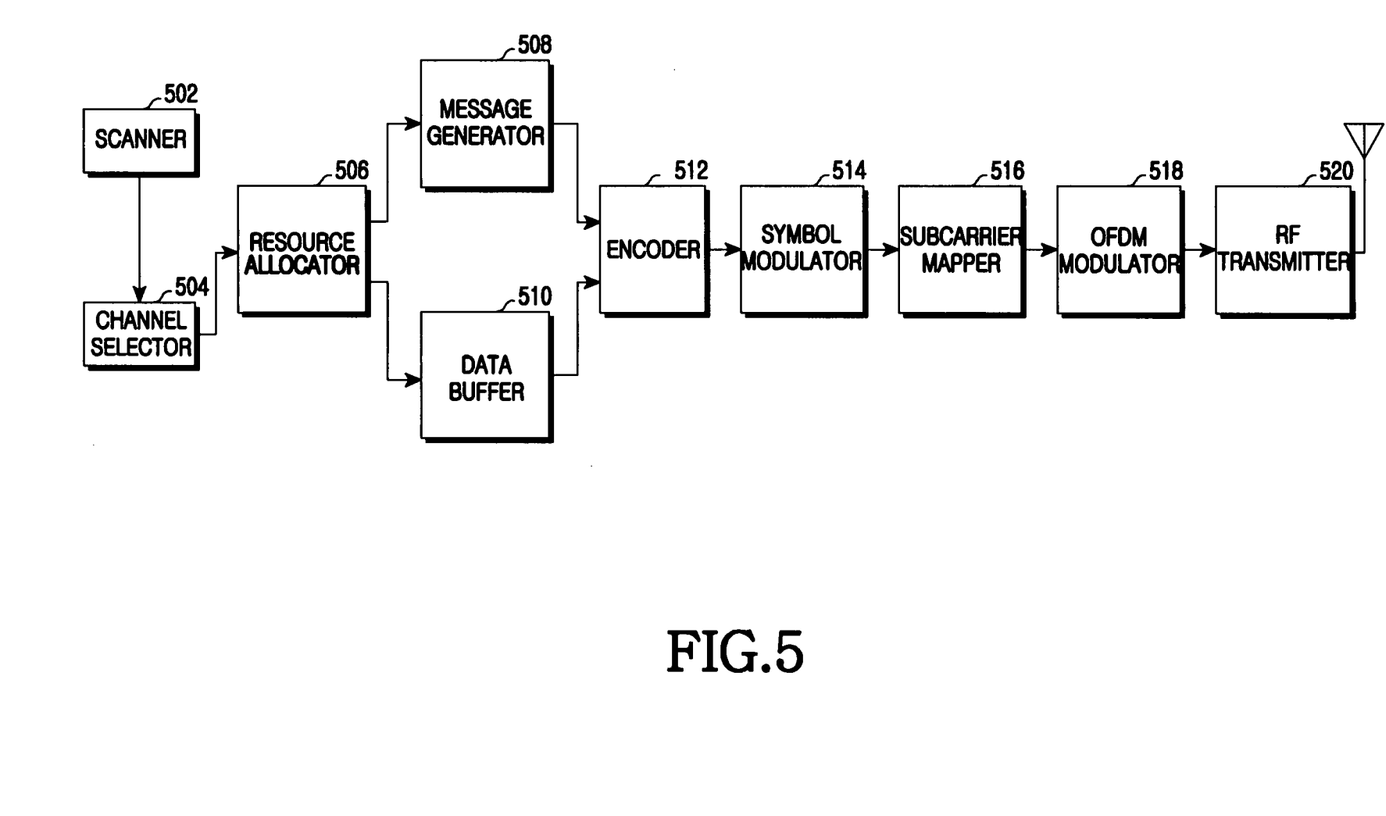
FIG. 5 illustrates a base station in the broadband wireless communication system according to an exemplary embodiment of the present invention.

FIG. 5 is a block diagram of a base station in the broadband wireless communication system according to an exemplary embodiment of the present invention.

The base station of FIG. 5 includes a scanner 502, a channel selector 504, a resource allocator 506, a message generator 508, a data buffer 510, an encoder 512, a symbol modulator 514, a subcarrier mapper 516, an OFDM modulator 518, and a radio frequency (RF) transmitter 520.

The scanner 502 scans the band when the base station is initialized. In more detail, the scanner 502 confirms one or more channels unused by a licensed system, using information on signal strength per band of signals received through a signal receiver (not shown), and informs the channel selector 504 of the confirmed channels.

The channel selector 504 selects channels to be used for the communication from the one or more unused channels confirmed by the scanner 502. The channel selector 504 selects the channels covered by the maximum usable successive channel range of the base station. For example, when the base station can use four consecutive channels at maximum, the channel selector 504 selects the channels in such a manner that every interval between the channel pairs of the selected channels does not exceed two channels. In so doing, the selected channels may be consecutive or nonconsecutive.

The resource allocator 506 allocates the bursts to the ATs within the channels selected by the channel selector 504. The resource allocator 506 assigns the bursts to the ATs in a descending order based on the number of the channels in use. That is, the channel allocator 506 allocates the burst preferentially to the AT having the greatest number of the channels in use. In the descending order based on the number of the channels in use, the resource allocator 506 selects the AT to be assigned the burst amongst the multiple ATs. Particularly, to allocate the bursts to the AT using a plurality of channels at the same time, the resource allocator 506 allots the same amount of the burst to each individual channel used by the AT. For example, when the AT is using two channels of the channel 1 and the channel 2 to allocate the bursts in the size of 10 subchannels to the AT, the resource allocator 506 assigns the bursts of the size corresponding to five subchannels in the channel 1 and the bursts of the size corresponding to five subchannels in the channel 2. The resource allocator 506 allocates the bursts to the AT at the position indicated by the same allocation information in each channel.

Herein, the bursts are allocated in two dimensions or in one dimension according to an exemplary embodiment of the present invention. In the two-dimensional burst allocation, the allocated burst is rectangular as shown in FIGS. 1 and 2 and is represented with the start point and the end point. In contrast, in the one-dimensional burst allocation, the allocated burst is linear as shown in FIGS. 3 and 4 and is represented with the number of the subchannels.

The message generator 508 generates a control message to be sent to the AT. For example, the message generator 508 generates a Frame Control Header (FCH), a Downstream Channel Descriptor (DCD), an Upstream Channel Descriptor (UCD), a DS map message, and a US map message. Herein, the control message is generated per channel. More specifically, as for the DS map message, the message generator 508 generates the map message per channel, including only the allocation information of the bursts assigned to the ATs which use the corresponding channel as their primary channel. In other words, the message generator 508 generates the map message per channel, not including the allocation information of the bursts assigned to the ATs which do not use the corresponding channel as their primary channel. The map message includes only the allocation information of the bursts allocated to the ATs which use the corresponding channel as their primary channel.

Herein, the constitution of the allocation information varies in implementations of the burst form. For instance, when the burst is allocated in two dimensions (that is, in rectangular form), the allocation information includes the start information of the burst and the end information of the burst. When the burst is allocated in one dimension (that is, in linear form), the allocation information includes the information relating to the number of the subchannels in the burst. Note that the map information can further include the allocation information of the dummy burst when the burst is allocated in one dimension.

The data buffer 510 stores data to be transmitted to the AT and outputs the stored data according to the burst allocation result of the resource allocator 506. The encoder 512 channel-codes information bit streams provided by the message generator 508 and the data buffer 510. The symbol modulator 514 demodulates and converts the coded bit stream to complex symbols. The subcarrier mapper 516 maps the complex symbols onto the frequency domain according to the burst allocation result of the resource allocator 506. The OFDM modulator 518 converts the complex symbols mapped to the frequency domain to a time-domain signal through Inverse Fast Fourier Transform (IFFT), and constitutes OFDM symbols by inserting a Cyclic Prefix (CP). The size of the IFFT operation conducted by the OFDM modulator 518 covers the entire band of the available maximum channels of the base station. For example, when the IFFT operation size for one channel is $N_{IFFT}$ and the base station can utilize four channels at maximum, the OFDM modulator 518 performs the IFFT operation in the size $4 \times N_{IFFT}$. The RF transmitter 520 up-converts the baseband signal to an RF signal and transmits the RF signal over an antenna. The band up-converted by the RF transmitter 520 varies depending on the band of the channels selected by the channel selector 504.

Figure 6:
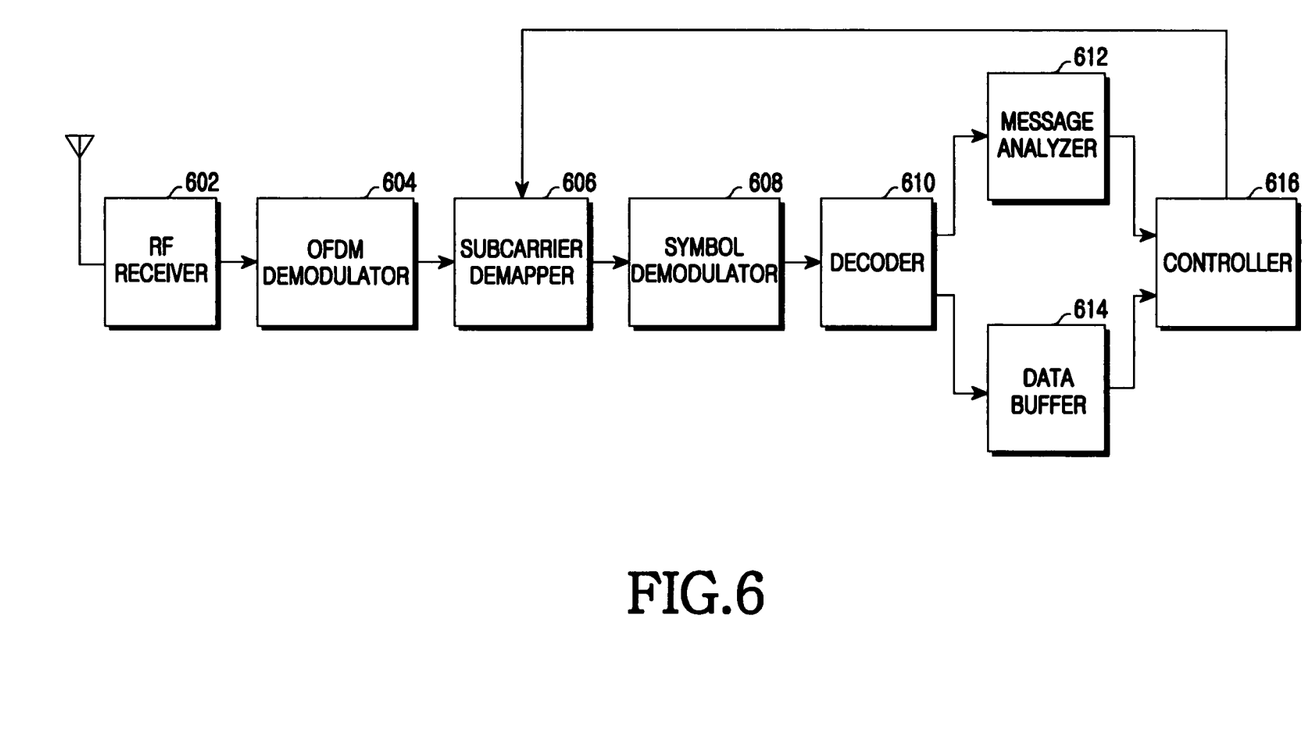
FIG. 6 illustrates an Accessing Terminal (AT) in the broadband wireless communication system according to an exemplary embodiment of the present invention.

FIG. 6 is a block diagram of the AT in the broadband wireless communication system according to an exemplary embodiment of the present invention.

The AT of FIG. 6 includes an RF receiver 602, an OFDM demodulator 604, a subcarrier demapper 606, a symbol demodulator 608, a decoder 610, a message analyzer 612, a data buffer 614, and a controller 616.

The RF receiver 602 down-converts the RF signal received via an antenna to a baseband signal. The OFDM demodulator 604 divides the signal output from the RF receiver 602 on an OFDM symbol basis, eliminates the CP, and restores the complex symbols mapped to the frequency domain through Fast Fourier Transform (FFT). In so doing, the size of the FFT operation conducted by the OFDM demodulator 604 covers the entire band of the available maximum channels of the AT. For example, when the FFT operation size for one channel is $N_{FFT}$ and the AT can utilize two channels at maximum, the OFDM demodulator 604 performs the FFT operation in the size $2 \times N_{IFFT}$. The subcarrier demapper 606 extracts the signal mapped to its allocated resource from the complex symbols mapped to the frequency domain. The symbol demodulator 608 demodulates and converts the complex symbols to a bit stream. The decoder 610 restores the information bit stream by channel-decoding the bit stream.

The message analyzer 612 analyzes the control message received from the base station. For instance, the message analyzer 612 analyzes the FCH, the DCD, the UCD, the DS map message, and the US map message. Herein, the control message is received per channel. Particularly, in analyzing the DS map message, the message analyzer 612 analyzes only the map message received in the primary channel of the AT among the multiple channels in use. Namely, the message analyzer 612 ignores the DS map messages received in channels other than the primary channel. The message analyzer 612 confirms the allocation information of the bursts allocated to the AT in the primary channel and provides the confirmed allocation information to the controller 616.

Herein, the constitution of the allocation information varies in implementations of the burst form. For instance, when the burst is allocated in two dimensions (that is, in rectangular form), the allocation information includes the start information of the burst and the end information of the burst. When the burst is allocated in one dimension (that is, in linear form), the allocation information includes the information relating to the number of the subchannels in the burst. Note that the map information can further include the allocation information of the dummy burst when the burst is allocated in one dimension. In this situation, the message analyzer 612 provides the allocation information of the dummy bursts to the controller 616.

The data buffer 614 temporarily stores the data bit stream received from the base station until the data bit stream is processed by the controller 616. The controller 616 controls the communications of the AT. More specifically, the controller 616 confirms the location of its assigned bursts in the respective channels using the allocation information in the DS map message interpreted by the message analyzer 612, and instructs the subcarrier demapper 606, the symbol demodulator 608, and the decoder 610 to convert the signal mapped to the confirmed locations of the channels to a bit stream. In other words, the controller 616 determines locations of its assigned bursts in the respective channels in use by equally applying the confirmed burst location based on the allocation information to the channels in use.

The burst location confirming operation of the controller 616 varies in implementations of the burst form. For instance, when the bursts are allocated in rectangular form, the controller 616 receives the start information and the end information of the burst from the message analyzer 612, and determines locations its allocated bursts in the channels in use using the start information and the end information. By contrast, when the bursts are allotted in linear form, the controller 616 receives the length information of its assigned bursts, the length information of one or more bursts previously allocated, and the length information of the dummy bursts from the message analyzer 612, attains a start offset value of its allocated bursts by summing up the length of the dummy bursts and the length of one or more previous bursts, and determines locations its allocated bursts in the channels in use according to the start offset value and the length information of its allocated bursts.

Figure 7:
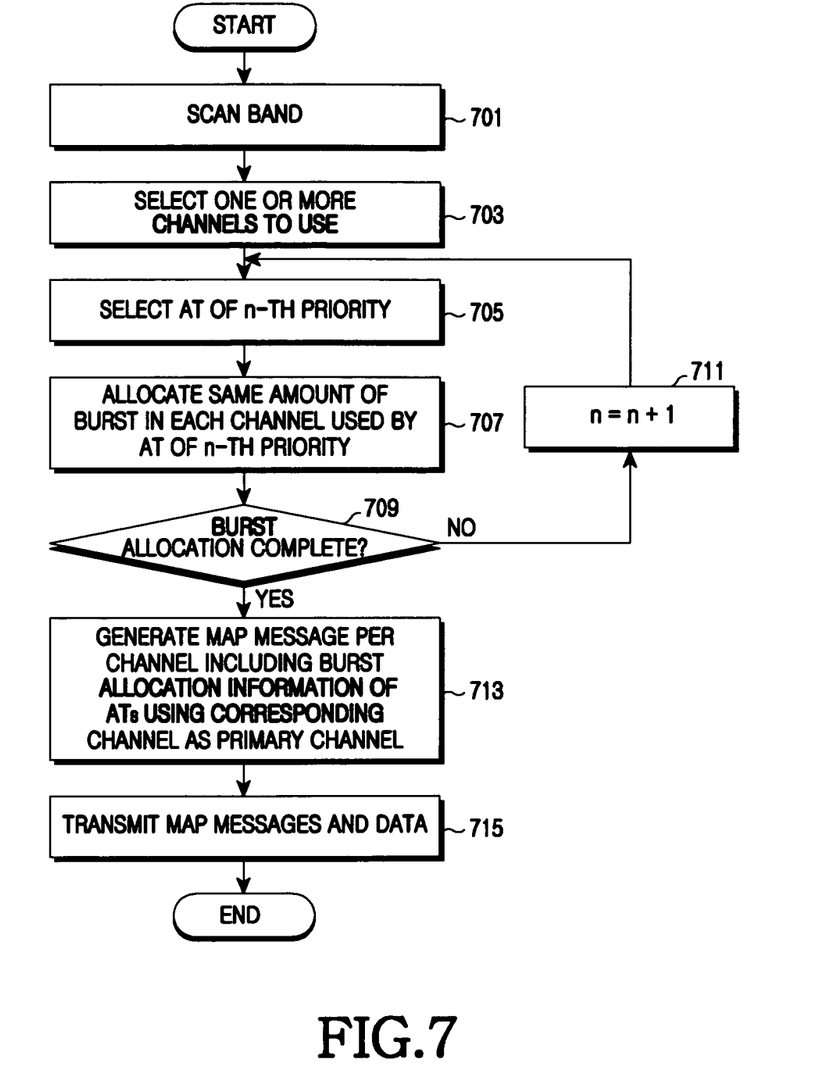
FIG. 7 illustrates operations of the base station in the broadband wireless communication system according to an exemplary embodiment of the present invention.

FIG. 7 is a flowchart of operations of the base station in the broadband wireless communication system according to an exemplary embodiment of the present invention.

In step 701, the base station scans the band. In the initialization, the base station checks for one or more channels not used by the licensed system using the information on signal strength per band of the received signals.

In step 703, the base station selects one or more channels to be used for the communications among the one or more channels checked in step 701. The base station selects the channels such that the selected channels are included in a range of the available maximum consecutive channels of the base station. For example, when the base station can use four consecutive channels at maximum, the base station selects the channels in a manner that every interval between the channel pairs of the selected channels does not exceed two channels. In so doing, the selected channels may be consecutive or nonconsecutive. Hereinafter, it is assumed that a plurality of channels is selected.

In step 705, the base station selects the AT of the n-th priority. When present process commences, n is initialized to 1. The base station allocates the bursts to the ATs in the descending order of the number of the channels in use. That is, the base station assigns the bursts preferentially to the AT which uses the greatest number of the channels. The AT using the most channels is given the higher priority.

In step 707, the base station allocates the same amount of the burst in each channel used by the AT of the n-th priority. For instance, when the AT of the n-th priority is using two channels of the channel 1 and the channel 2, to allocate the bursts of the size corresponding to 10 subchannels to the AT of the n-th priority, the base station assigns the bursts of the size corresponding to the 5 bursts in the channel 1 and the bursts of the size corresponding to the 5 bursts in the channel 2. The base station allots the bursts for the AT of the n-th priority at the location indicated by the same allocation information in each channel. Herein, the bursts are allocated in two dimensions or in one dimension according to various implementations. In the two-dimensional burst allocation, the allocated burst is rectangular as shown in FIGS. 1 and 2 and is represented with the start point and the end point. In contrast, in the one-dimensional burst allocation, the allocated burst is linear as shown in FIGS. 3 and 4 and is represented by the number of the subchannels.

In step 709, the base station checks whether the burst allocation is completed or not. That is, the base station checks whether there exists the allocable resource in the DS frame.

If the burst allocation is not completed, the base station increases n by 1 in step 711. Next, the base station repeats the steps 705, 707 and 709.

When the burst allocation is completed, the base station generates map messages corresponding to the respective channels in step 713. The base station generates the map messages for the channels, including the allocation information of the bursts allocated to the ATs which utilize the corresponding channel as the primary channel. In other words, the base station generates the map message per channel, not including the allocation information of the bursts assigned to the ATs which do not use the corresponding channel as the primary channel. The map message includes only the allocation information of the bursts allocated to the ATs which use the corresponding channel as their primary channel. Herein, the constitution of the allocation information varies in implementations of the burst form. For instance, when the burst is allocated in two dimensions (that is, in rectangular form), the allocation information includes the start information of the burst and the end information of the burst. When the burst is allocated in one dimension (that is, in linear form), the allocation information includes the information relating to the number of the subchannels in the burst. Note that the map information can further include the allocation information of the dummy burst when the burst is allocated in one dimension.

In step 715, the base station transmits the per channel map messages generated in step 713 and the data corresponding to the bursts allocated in step 707. More specifically, the base station converts the data to the complex symbols and maps the complex symbols to the subchannels according to the burst allocation result of step 707. The base station converts the complex symbols mapped to the subchannels to OFDM symbols through IFFT operation and CP insertion, up-converts to the RF signal, and then transmits the RF signal over the antenna.

Figure 8:
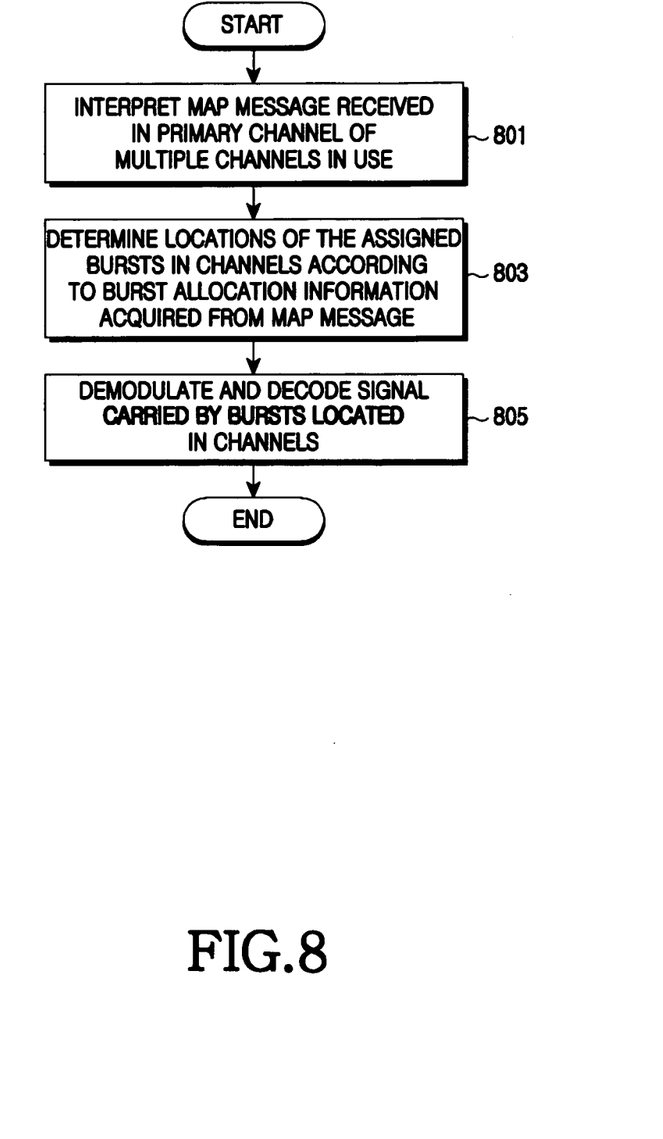
FIG. 8 illustrates operations of the AT in the broadband wireless communication system according to an exemplary embodiment of the present invention.

FIG. 8 is a flowchart of operations of the AT in the broadband wireless communication system according to an exemplary embodiment of the present invention.

In step 801, the AT interprets the map message received in its primary channel among the multiple channels in use. The AT ignores the map messages received in channels other than the primary channel, and analyzes only the map message received over the primary channel. The AT acquires the allocation information of the bursts allocated to the AT by analyzing the map message. Herein, the constitution of the allocation information varies in implementations of the burst form. For instance, when the burst is allocated in two dimensions (that is, in rectangular form), the allocation information includes the start information of the burst and the end information of the burst. When the burst is allocated in one dimension (that is, in linear form), the allocation information includes the information relating to the number of the subchannels in the burst. Note that the map information can further include the allocation information of the dummy burst when the burst is allocated in one dimension.

In step 803, the AT confirms the location of its assigned bursts in the respective channels in use according to the burst allocation information acquired by analyzing the map message received in the primary channel. In other words, the AT determines locations of its allocated bursts in the respective channels in use by equally applying the confirmed burst location based on the allocation information to the channels in use. The burst location confirming operation of the AT varies in implementations of the burst form. For instance, when the bursts are allocated in rectangular form, the AT acquires the start information and the end information of the burst in step 801 and determines locations of its allocated bursts in the channels in use according to the start information and the end information. By contrast, when the bursts are allotted in linear form, the AT acquires the length information of its assigned bursts, the length information of one or more bursts previously allocated, and the length information of the dummy bursts, obtains the start offset value of its allocated bursts by summing up the length of the dummy bursts and the length of one or more previous bursts, and determines locations its allocated bursts in the channels in use according to the start offset value and the length information of its allocated bursts.

In step 805, the AT extracts the signal received through the bursts located in the channels and restores the data by demodulating and decoding the extracted signal.

In the broadband wireless communication system with the multiple channels, bursts of the same location and the same amount are assigned to the AT which utilizes multiple channels of the available the channels. Therefore, the overhead of the map message for carrying the burst allocation information can be reduced.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for a base station in a wireless communication system using multiple channels, the apparatus comprising:
   an allocator configured to allocate a same amount of bursts to an Access Terminal (AT), in a first channel and a second channel, wherein the burst in the first channel and the burst in the second channel are indicated by same allocation information;
   a generator configured to generate a first resource allocation message for the first channel and a second resource allocation message for the second channel, wherein allocation information for the AT using the first channel as a primary channel is included only in the first resource allocation message, and allocation information for at least one other AT using the second channel as the primary channel is included only in the second resource allocation message; and
   a transmitter configured to transmit the first resource allocation message in the first channel and the second resource allocation message in the second channel.

2. The apparatus of claim 1, wherein the allocator is configured to allocate the burst in a rectangular form, and
   the allocation information comprises a start information of the burst and an end information of the burst.

3. The apparatus of claim 1, wherein the allocator is configured to allocate the burst in a linear form, and
   the allocation information comprises information relating to the number of subchannels of the burst.

4. The apparatus of claim 3, wherein the resource allocation message comprises at least one of a dummy burst allocation information of a corresponding channel, and the burst allocation information of at least one AT which has a corresponding channel as the primary channel.

5. The apparatus of claim 1, wherein the allocator is configured to select at least one AT to be assigned the bursts from among a plurality of ATs, in a descending order of the number of channels in use.

6. The apparatus of claim 1, further comprising:
   a scanner configured to confirm one or more channels not used by a licensed system by scanning a band; and
   a selector configured to select one or more channels to be used according to the scanning result.

7. An apparatus for an Access Terminal (AT) in a wireless communication system using multiple channels, the apparatus comprising:
   a receiver configured to receive a resource allocation message through a first channel, wherein allocation information for the AT using the first channel as a primary channel is included only in the resource allocation message received through the first channel;
   an analyzer configured to confirm the allocation information in the resource allocation message received through the first channel; and
   a controller configured to locate bursts assigned to the AT in the first channel and a second channel according to the allocation information, wherein the burst in the first channel and the burst in the second channel are indicated by the allocation information.

8. The apparatus of claim 7, wherein the controller is configured to determine locations of the bursts allocated to the AT in the first channel and the second channel by equally applying the location of the burst acquired from the allocation information to the first channel and the second channel.

9. The apparatus of claim 8, wherein the allocation information comprises a start information of the burst and an end information of the burst.

10. The apparatus of claim 8, wherein the allocation information comprises information relating to the number of subchannels of the burst.

11. The apparatus of claim 10, wherein the resource allocation message comprises at least one of a dummy burst allocation information of a corresponding channel, and the burst allocation information of at least one AT which has a corresponding channel as the primary channel.

12. The apparatus of claim 11, wherein the controller is configured to:
   calculate a start offset value of the bursts allocated to the AT using the dummy burst allocation information and at least one burst allocation information prior to the allocated bursts; and
   determine locations of the bursts allocated to the AT using the start offset value and the allocation information of the bursts allocated to the AT.

13. An operating method of a base station in a wireless communication system using multiple channels, the method comprising:
   allocating a same amount of bursts to an Access Terminal (AT) in the first channel and the second channel, wherein the burst in the first channel and the burst in the second channel are indicated by same allocation information;
   generating a first resource allocation message for the first channel and a second resource allocation message for the second channel, wherein allocation information for the AT using the first channel as a primary channel is included only in the first resource allocation message, and allocation information for at least one other AT using the second channel as the primary channel is included only in the second resource allocation message; and
   transmitting the first resource allocation message in the first channel and the second resource allocation message in the second channel.

14. The operating method of claim 13, wherein the burst is allocated in a rectangular form, and
   the allocation information comprises a start information of the burst and an end information of the burst.

15. The operating method of claim 13, wherein the burst is allocated in a linear form, and
   the allocation information comprises information relating to the number of subchannels of the burst.

16. The operating method of claim 15, wherein the resource allocation message comprises at least one of a dummy burst allocation information of a corresponding channel, and the burst allocation information of at least one AT which has a corresponding channel as the primary channel.

17. The operating method of claim 13, further comprising:
   selecting at least one AT to be assigned the bursts from a plurality of ATs, in a descending order of the number of channels in use.

18. The operating method of claim 13, further comprising:
   confirming one or more channels not used by a licensed system by scanning a band; and
   selecting one or more channels to be used according to the scanning result.

19. An operating method of an Access Terminal (AT) in a wireless communication system using multiple channels, the method comprising:

receiving a resource allocation message through a first channel, wherein allocation information for the AT using the first channel as a primary channel is included only in the resource allocation message received through the first channel;

confirming allocation information in the resource allocation message received through the first channel; and locating bursts assigned to the AT in the first channel and a second channel according to the allocation information, wherein the burst in the first channel and the burst in the second channel are indicated by the allocation information.

20. The operating method of claim 19, wherein locating the bursts assigned to the AT in the first channel and the second channel comprises:

locating the bursts allocated to the AT in the channels in use by equally applying the location of the burst acquired from the allocation information to the first channel and the second channel.

21. The operating method of claim 20, wherein the allocation information comprises start information of the burst and end information of the burst.

22. The operating method of claim 20, wherein the allocation information comprises information relating to the number of subchannels of the burst.

23. The operating method of claim 22, wherein the resource allocation message comprises at least one of a dummy burst allocation information of a corresponding channel, and the burst allocation information of at least one AT which has a corresponding channel as the primary channel.

24. The operating method of claim 23, wherein the locating of the bursts comprises:

calculating a start offset value of the bursts allocated to the AT using the dummy burst allocation information and at least one burst allocation information prior to the allocated bursts; and locating the bursts allocated to the AT using the start offset value and the allocation information of the bursts allocated to the AT.

* * * * *